(12) United States Patent
Wolfram et al.

(10) Patent No.: US 10,055,468 B2
(45) Date of Patent: Aug. 21, 2018

(54) ACCESS TO DATA COLLECTIONS BY A COMPUTATIONAL SYSTEM

(71) Applicant: WOLFRAM RESEARCH, INC., Champaign, IL (US)

(72) Inventors: Stephen Wolfram, Concord, MA (US); Todd Gayley, Naperville, IL (US); Michael Pilat, Chicago, IL (US)

(73) Assignee: Wolfram Research, Inc., Champaign, IL (US)

( * ) Notice: Subject to any disclaimer, the term of this patent is extended or adjusted under 35 U.S.C. 154(b) by 436 days.

(21) Appl. No.: 14/629,335

(22) Filed: Feb. 23, 2015

(65) Prior Publication Data
US 2015/0169679 A1    Jun. 18, 2015

Related U.S. Application Data

(63) Continuation of application No. 12/113,183, filed on Apr. 30, 2008, now abandoned.

(60) Provisional application No. 60/914,928, filed on Apr. 30, 2007.

(51) Int. Cl.
    *G06F 17/30* (2006.01)
(52) U.S. Cl.
    CPC .............. *G06F 17/3056* (2013.01)
(58) Field of Classification Search
    CPC .................................................. G06F 17/3056
    See application file for complete search history.

(56) References Cited

U.S. PATENT DOCUMENTS

| | | | | |
|---|---|---|---|---|
| 6,173,276 B1* | 1/2001 | Kant | ...................... | G06F 17/13 706/50 |
| 6,920,608 B1* | 7/2005 | Davis | .................. | G06F 17/2247 715/209 |
| 8,726,278 B1* | 5/2014 | Shawver | ............... | G06F 9/4881 718/100 |
| 8,782,081 B2* | 7/2014 | Guan | .................. | G06F 17/3056 707/779 |
| 2004/0049499 A1* | 3/2004 | Nomoto | ............ | G06F 17/30654 707/707 |
| 2005/0027491 A1* | 2/2005 | Fertner | ............... | G06F 17/5036 702/196 |
| 2005/0216503 A1* | 9/2005 | Charlot | .................. | G06Q 50/22 707/707 |
| 2005/0234686 A1* | 10/2005 | Cheng | ..................... | G06F 17/12 703/2 |
| 2005/0234936 A1* | 10/2005 | Castro | ..................... | H04L 67/06 707/707 |

(Continued)

*Primary Examiner* — Robert Beausoliel, Jr.
*Assistant Examiner* — Alexandria Bromell
(74) *Attorney, Agent, or Firm* — Drinker Biddle & Reath LLP

(57) ABSTRACT

A data function in received. The data function is indicative of a request for data from a database, and is included in a library of built-in functions of a computational software application. In response to receiving the data function, a request for database data is transmitted to a database system via a network. In response to the request for data, the database data is received from the database system via the network. In response to receiving the database data via the network, an expression is created using at least a portion of the received database data. The expression is capable of being operated on by the computational software application.

9 Claims, 6 Drawing Sheets

(56) References Cited

U.S. PATENT DOCUMENTS

| | | | | |
|---|---|---|---|---|
| 2007/0022368 A1* | 1/2007 | Bauchot | ............... | G06F 17/246 715/201 |
| 2007/0130299 A1* | 6/2007 | Dean | .................... | G06F 9/5027 709/222 |
| 2007/0220034 A1* | 9/2007 | Iyer | .................. | G06F 17/30539 707/707 |
| 2007/0288477 A1* | 12/2007 | Rekimoto | ......... | G06F 17/30884 707/707 |
| 2008/0021951 A1* | 1/2008 | Lurie | .................. | G06F 9/5072 709/202 |
| 2008/0082567 A1* | 4/2008 | Bezanson | ............... | G06F 17/16 707/707 |
| 2009/0157711 A1* | 6/2009 | Baer | .................. | G06F 17/3089 707/707 |
| 2009/0235154 A1* | 9/2009 | Khen | ...................... | G06F 9/541 715/219 |
| 2010/0070515 A1* | 3/2010 | Dutton | ............. | G06F 17/30091 707/755 |
| 2010/0317420 A1* | 12/2010 | Hoffberg | ............ | G06Q 30/0207 463/1 |
| 2011/0099185 A1* | 4/2011 | Trevor | ............. | G06F 17/30861 707/756 |
| 2012/0221511 A1* | 8/2012 | Gibson | ............ | G06F 17/30572 707/602 |
| 2012/0239612 A1* | 9/2012 | George | ............ | G06F 17/30563 707/602 |
| 2013/0117288 A1* | 5/2013 | De Smet | ........... | G06F 17/30421 707/756 |
| 2014/0032579 A1* | 1/2014 | Merriman | ......... | G06F 17/30345 707/756 |
| 2014/0108399 A1* | 4/2014 | White | ............... | G06F 17/30404 707/736 |
| 2015/0331928 A1* | 11/2015 | Ghaemi | ............ | G06F 17/30589 707/602 |

* cited by examiner

230

```
In[4]:= Map[{#,CountryData[#,"Population"]}&,CountryData[]]//TableForm
Out[4]//TableForm=
```

| | |
|---|---|
| Afghanistan | $2.9863*10^7$ |
| Albania | $3.12968*10^6$ |
| Algeria | $3.28538*10^7$ |
| AmericanSamoa | 57794 |
| Andorra | 66935. |
| Angola | $1.549*10^7$ |
| Anguilla | 12205. |
| AntiguaBarbuda | 80518. |
| Argentina | $3.87471*10^7$ |
| Armenia | $3.01631*10^6$ |
| Aruba | 99468. |
| Australia | $2.01551*10^7$ |
| Austria | $8.18944*10^6$ |
| Azerbaijan | $8.4108*10^6$ |
| Bahamas | 323063. |
| Bahrain | 726617. |
| Bangladesh | $1.41822*10^8$ |
| Barbados | 269556. |
| Belarus | $9.75511*10^6$ |
| Belgium | $1.0419*10^7$ |
| Belize | 269736. |
| Benin | $8.43885*10^6$ |
| Bermuda | 64174. |
| Bhutan | $2.16255*10^6$ |
| Bolivia | $9.18202*10^6$ |
| BosniaHerzegovina | $3.90707*10^6$ |
| Botswana | $1.76493*10^6$ |
| Brazil | $1.86405*10^8$ |
| BritishVirginIslands | 22016. |
| Brunei | 373819. |
| Bulgaria | $7.72597*10^6$ |
| BurkinaFaso | $1.32278*10^7$ |
| Burundi | $7.54752*10^6$ |
| Cambodia | $1.4071*10^7$ |
| Cameroon | $1.63219*10^7$ |
| Canada | $3.22682*10^7$ |
| CapeVerde | 506807. |
| CaymanIslands | 45017. |
| ⋮ | ⋮ |

```
In[1]:= SortBy[
     Tally[Flatten[Table[ElementData[z, "DiscoveryCountries"], {z, 1, 108}]]], Last]
Out[1]= {{Finland, 1}, {Italy, 1}, {Mexico, 1}, {Romania, 1}, {SouthAmerica, 1}, {Spain, 1},
     {Austria, 2}, {Denmark, 2}, {Russia, 3}, {Switzerland, 3}, {France, 16},
     {Germany, 16}, {UnitedStates, 16}, {Sweden, 20}, {UnitedKingdom, 23}}
```

240↘

ACCESS TO DATA COLLECTIONS BY A COMPUTATIONAL SYSTEM

CROSS-REFERENCE TO RELATED APPLICATION

This application is a continuation of U.S. application Ser. No. 12/113,183, entitled "ACCESS TO DATA COLLECTIONS BY A COMPUTATIONAL SYSTEM," filed on Apr. 30, 2008, which claims the benefit of U.S. Provisional Application No. 60/914,928, entitled "ACCESS TO DATA COLLECTIONS BY A COMPUTATIONAL SYSTEM," filed on Apr. 30, 2007. Both applications referenced above are hereby incorporated by reference herein in their entireties.

TECHNICAL FIELD

This disclosure generally relates to computational software applications, and more particularly to accessing a database via a computational software application.

BACKGROUND

This disclosure will refer to a particular implementation of these techniques in the MATHEMATICA® software system available from Wolfram Research, Inc. The methods themselves are more general and could be implemented in a variety of software environments. To understand the illustrations, however, requires some familiarity with the MATHEMATICA® environment.

MATHEMATICA® is a powerful computational tool that can evaluate general symbolic expressions, as well as mathematical and numeric expressions. A unifying feature of MATHEMATICA® is that everything is internally represented as a symbolic expression, with all more specific data types treated as special cases—symbols to which additional rules apply. MATHEMATICA® is an interpreted language, with a notion of "evaluation" of symbolic expressions. The system evaluates expressions by applying to any symbolic expression all transformation rules that fit the expression.

In the MATHEMATICA® software system, a user can create interactive electronic documents referred to as "notebooks." Various expressions, including numeric expressions, symbolic expressions, graphics expressions, user-interface elements, dynamic/interactive elements, etc. can be entered into a notebook via a keyboard, for example, and a user can cause the expression to be evaluated. The MATHEMATICA® software system includes a library of built-in functions (a type of expression) for performing numeric or symbolic analysis, creating plots and graphics, formatting the display of outputs, etc. Additionally, a user can build a large number of other functions using combinations of the library functions. When the MATHEMATICA® software system evaluates an expression, which may include one or more of the built-in library functions, it builds a new expression representing the result.

If the MATHEMATICA® software system is to be used for data analysis, the data must be created using the MATHEMATICA® software system or somehow imported into the system via a notebook, a file, etc. To import data into a notebook, a user may "Cut" or "Copy" the data from a web page, a word processing document, a spread sheet, etc. Additionally, it may be necessary to convert the data to a format appropriate for the desired analysis. For example, numerical data copied from a web page may be in an ASCII text format, and it may be necessary to convert it to a numeric format such as an integer format, a floating point format, etc., prior to performing an analysis or processing of the data. Alternatively, a user could utilize library functions provided with the MATHEMATICA® software system or provided by a third-party to import data from a file. Such functions require the location of the file to be specified.

BRIEF DESCRIPTION OF THE DRAWINGS

FIG. 3B is an illustration of another example notebook in which the data function CountryData is included as part of a larger expression;

DETAILED DESCRIPTION

Example Environment

Figure 1:
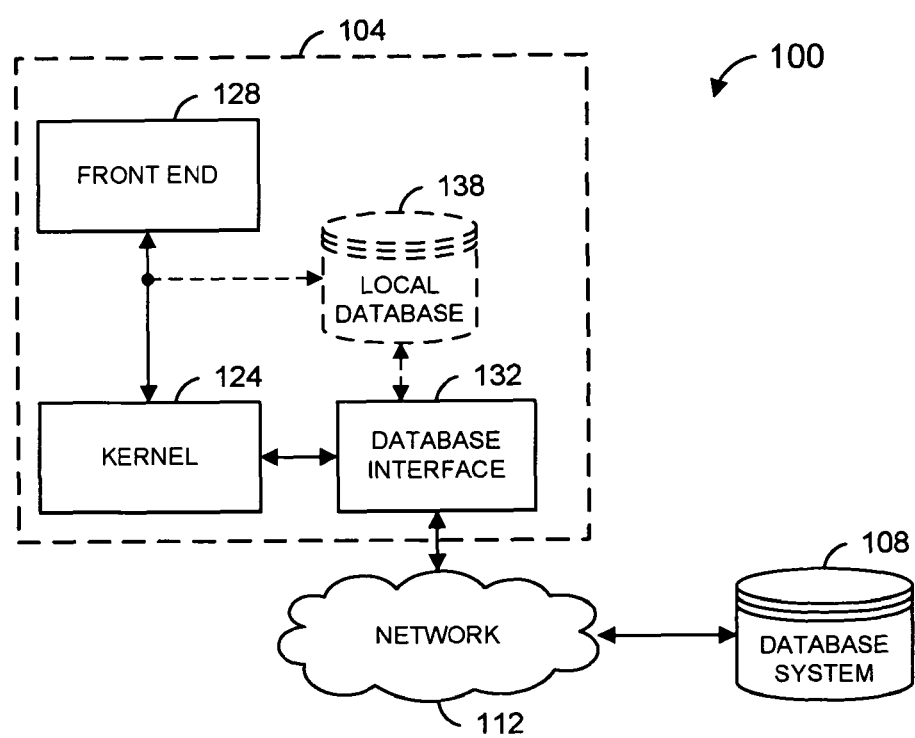
FIG. 1 is a block diagram of an example system in which methods and techniques described herein may be implemented.

FIG. 1 is a high level block diagram of an example system 100 in which methods and techniques to be described below may be implemented. In particular, the system 100 comprises a computational software application 104 and a database system 108 communicatively coupled via a network 112. The computational software application 104 may comprise a kernel 124 in data communication with a front end 128. In general, the kernel 124 may comprise software components that perform computations such as numeric computations, symbolic computations, graphic computations, etc. The front end 128 may comprise software components that handle interaction with a user. For example, the front end 128 may include software configured to permit the user to enter expressions to be evaluated by the kernel 124, to permit a user to initiate evaluations of expressions, to display results of evaluations to the user, etc. The user may enter expressions, specify evaluations to be performed, etc., by entering commands via the front end 128 that are recognizable by the kernel 124. In other words, the kernel 124 responds to expressions that it recognizes and/or is able to interpret and performs actions indicated by the expressions such as a symbolic analysis, a numeric analysis, etc.

The kernel 124 and the front end 128 may be implemented on a same computing system or on different computing systems that are communicatively coupled to one another. Thus, the kernel 124 and the front end 128 may communicate via a communication link that comprises one or more of procedure calls, messages, a proprietary application programming interface (API) (e.g., the API provided by MATHLINK® software available from Wolfram Research, Inc.), etc. Additionally, if the kernel 124 and the front end 128 are implemented on different computing systems, the kernel 124 and the front end 128 may communicate via one or more of a local area network (LAN), a wide area network (WAN), the Internet, a point-to-point communication link, a wired communication link, a wireless communication link, etc. For instance, the kernel 124 and the front end 128 may communicate via the network 112, some other network, a point-to-point communication link, etc.

The front end 128 may include an interactive document referred to as a notebook similar to those often used with MATHEMATICA® software systems. A notebook may include input (e.g., expressions) to be sent to the kernel 124 and output received from the kernel 124, as well as text, graphics, palettes, etc. A notebook may include menus and graphical tools for creating and reading notebook documents and for sending information to and receiving information from the kernel 124.

The computational software application 104 includes a database interface 132 that permits the computational software application 104 to communicate with the database system 108 via the network 112. The network 112 may comprise a local area network (LAN), a wide area network (WAN), the Internet, a point-to-point communication link, a wired communication link, a wireless communication link, etc. The database interface 132 is coupled to the kernel 124. In other implementations, the database interface 132 may additionally or alternatively be coupled to the front end 124. The kernel 124 and the database interface 132 may be implemented on a same computing system or on different computing systems that are communicatively coupled to one another. In the example system 100, the database interface 132 permits the kernel 124 to retrieve data from the database system 108 in response to functions received from the front end 128. In one embodiment, the database interface 132 may include a Java® Runtime Environment or Engine (JRE) available from Sun Microsystems of Santa Clara, Calif., USA. The database interface 132 may also function as a virtual machine residing on the system 100.

The database system 108 may include a variety of data that may be processed and/or analyzed by the computational software application 104. For example, the database system 108 may include data collections of one or more of the following types: scientific, economic, geographic, historical, business, astronomic, chemical, biological, nutritional, engineering, etc. Typically, the database system 108 may store data collections that are maintained and/or updated frequently by an organization or a group. Thus, in some embodiments, the database system 108 may provide to a user of the computational software application 104 access to data that may be impractical and/or expensive for the user to collect and maintain as an individual. Also, in some embodiments, the organization or group may keep data collections centralized in the database system 108 to ease maintenance of the data collections as compared to multiple data collections dispersed across a large number of database systems. At the same time, a large number of individuals may have easy access to the data collections via computational software applications, such as the computational software application 104, and via the network 112. For example, the database system 108 may distribute the data collections from a web server. The system 100 allows the computational software application 104 to provide to a user access to a large amount of data that could not practically be stored on a computing system of the user. Additionally, in the system 100, the data may be changed, the data may be updated, new data may be added, etc., without requiring a new version, new release, etc., of the computational software application 104. In some embodiments, the database system 108 may include many datasets from different sources that have been curated and organized into a cohesive whole. As an example, the database system 108 may include curated and organized statistical records obtained from the United Nations, UNESCO and other international organizations.

The data stored in the database system 108 is in a format that can be processed by the computational software application 104. For example, the data received from the database system 108 may be in a format that permits the kernel 124 to create one or more expressions (e.g., symbolic expressions, numeric expressions) from the data. The one or more expressions may be created by the kernel 124 in response to the same functions that caused the kernel 124 to retrieve data from the database system 108. Thus, a user may enter a function via the front end 128 and, in response, the kernel 124 may create an expression that includes data retrieved from the database system 108. As another example, a user may enter an expression to analyze and/or process data to be retrieved the database system 108, and, in response, the kernel 124 may retrieve the data, evaluate the expression, and create an output expression that includes the evaluation of the data retrieved from the database system 108. In at least some embodiments, the user need not know and/or specify where the data to be retrieved is located (e.g., the user need not specify a file, a directory, an internet protocol (IP) address, a uniform resource locater (URL), etc.). Rather, the user may merely enter a function that indicates a request for the desired data. In at least some embodiments, the user may enter a single function via the computational software application 104 that causes the computational software application 104 to both retrieve requested data from the database system 108 and create an expression including the data. In environments other than the MATHEMATICA® software system, a variable or some other object that is capable of being operated upon by the computational software application may be created by the computational software application. Thus, the user need not specify one or more additional commands to otherwise import the data into the computational software application 104 and/or to convert the format of the data into a format recognized by and/or capable of being operated on by the computational software application 104.

The computational software application 104 may optionally include a local database 138 that may store information related to or retrieved from the database system 108. The local database 138 may be a local component or module executed by the same computing system that executes the computational software application 104. Alternatively, the local database 138 may be implemented by a computing system different from and communicatively coupled to the computing system that implements the computational software application 104. In this implementation, the local database 138 may be coupled to the computing device that implements the computational software application 104 via a point-to-point communication link, a network, etc. Typically, the computational software application 104 will be able to access the local database 138 much more quickly than the database system 108. The local database 138 may be coupled to one or more of the kernel 124, the front end 128 and/or the database interface 132.

Figure 2:
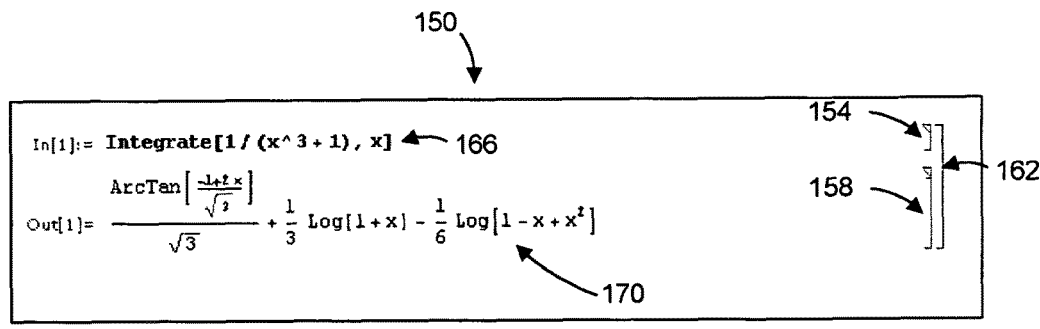
FIG. 2 is an illustration of an example notebook for a computational software application.

FIG. 2 is an illustration of an example notebook 150. A notebook may comprise a structured interactive document organized into a sequence of cells. Each cell may contain material of a definite type (e.g., text, graphics, sounds, an expression, a data object, etc.) or any combination of types. When a notebook is displayed on a screen of a computing system, the extent of each cell may be indicated by a bracket on the right. Referring to FIG. 2, brackets 154 and 158 indicate cells of the notebook 150. Also, cells can be grouped as indicated by the bracket 162.

A user can cause information in a cell to be sent to the kernel 124 as input by pressing "Enter" or "Return" while holding down the "Shift" key after a cursor has been placed in the cell. The kernel 124 then evaluates the input to generate an output. The kernel 124 may then send the generated output back to the front end 128. In response, the front end 108 may create one or more new cells in the notebook to display this output. Referring to FIG. 2, a line 158 corresponds to an input sent to the kernel 124 and a line 162 corresponds to an output generated by the kernel 124 and sent back to the front end 128. In notebooks used with MATHEMATICA® software systems, the front end 128 labels each line of input with "In[n]:=" and labels each line of output with "Out[n]=", where n indicates the nth input to the kernel 124 or the output generated by the kernel 124 in response to the nth input.

Alternatively, the front end 128 may comprise a text-based interface in which text typed on a keyboard of a computing system is sent directly to the kernel 124. With a text-based interface, a user may interact with the kernel 124 by typing successive lines of input, and getting back from the kernel 124 successive lines of output displayed on a display screen of the computing system. For example, a prompt of the form "In[n]:=" may be displayed on the display screen to indicate to a user that the kernel 124 is ready to receive input. After the input is typed in and sent to the kernel 124, the kernel 124 may process the input, generate an output, and send that output for display on the display screen with a label of the form "Out[n]=".

In some implementations, the front end 128 may be omitted. For example, a software program that does not interface with a user may communicate with the kernel 124 in a manner similar to communications between the kernel 124 and the front end 128 discussed above. This may comprise interaction via an API (e.g., the API provided by MATHLINK® software), via files, via an extensible markup language (XML), etc.

The kernel 124 may be capable of evaluating different kinds of expressions such as numeric computations, symbolic computations (e.g., algebraic computations, integrations, derivatives, etc.), graphic computations, etc. Referring again to FIG. 2, the expression 166 is a symbolic expression. The kernel 124 evaluated the expression 166 and generated an output expression 170 that is also symbolic. The kernel 124 may represent different types of computations to be evaluated in a common format which may be referred to as an "expression."

An example of an expression is f[x, y]. The expression f[x, y] could be used to represent a mathematical function, for example. A name of the function may be f, and the function includes two arguments: x and y. An expression need not be in the form f[x, y, . . . ]. For example, x+y may also be an expression. When x+y is typed in via the front end 128, for example, the front end 128 and/or the kernel 124 may convert it to a standard form such as "Plus[x, y]". When displaying the expression "Plus[x, y]" to a user via the front end 128, for example, it could be displayed in the form "x+y". The same symbolic expression may have different possible displayed forms: e.g., Plus[x,y], x+y. In one implementation, everything sent to the kernel 124 may be formatted as an expression.

Using a standard format of expressions as described above may help maintain a structure, which can then be acted on by other expressions. A list expression such as "{a, b, c}" does not specify an operation, but it does maintain a list structure. Other expressions can operate on this structure. The expression {a, b, c} typed by a user may be converted to a standard format such as "List[a, b, c]", for example.

An expression can be thought of as a "container of data", tagged with or otherwise associated with additional information about the expression. Even though all expressions may have the same basic structure, different "types" of expressions can be differentiated by the additional information with which the expression data is tagged. Then, the kernel 124 may include rules, routines, and/or programs that treat different types of expressions in different ways.

As an example, an expression may be a list having three elements. In a memory of a computing system implementing the kernel 124, the expression may comprise three pointers indicating the addresses in the memory at which actual expressions that form the elements of the list are to be found. These expressions may in turn include pointers to their sub-expressions. The chain of pointers may end when one reaches an object such as a number or a string, which is stored directly as a pattern of bits in the memory. It may also end if an object does not reference any other objects. For example, an object may be the symbol "x", where x has not been assigned a value.

A symbol such as "x" may be represented in memory by a pointer to an entry in a table of defined symbols. This table may be a repository of information about each symbol. For example, it may include a pointer to a string giving the symbol's name, as well as pointers to expressions which give rules for evaluating the symbol.

The kernel 124 may include an evaluator configured to evaluate functions that appear in an expression. The kernel 124 may include a library of functions, and the kernel 124 may be configured to perform operations corresponding to each function, and to build new expressions representing the results. If enough functions are included in the library, a user may be able build a large number of other functions using the combinations of the library functions.

The kernel 124 may be configured to perform symbolic calculations such as symbolic integration. Such symbolic calculations may be implemented by performing systematic procedures that may not correspond to how a person might perform a symbolic procedure "by hand". Such systematic procedures may include case specific procedures as well as general procedures.

In FIG. 1, a single database system, a single kernel 124, a single front end 128, and a single local database 138 are shown. One of ordinary skill in the art will recognize that multiple database systems 108, multiple kernels 124, multiple front ends 128, and/or multiple local databases 108 may be utilized. For example, a single front end 128 may communicate with a plurality of kernels 104. For instance, one front end 128 may interact with a first kernel 124 until a time T, cease interaction with the first kernel 124, and then begin interacting with a second kernel 124 after the time T. Also, one front end 128 may communicate with a plurality of kernels during a single time period. Similarly, one kernel 124 may interact with multiple front ends 128. As another example a single computational software application 104 may communicate with multiple database systems 108. As yet another example, a single computational software application 104 may communicate with multiple local databases 138. One of ordinary skill in the art will recognize many other variations.

Although the system 100 was described above as optionally being capable of evaluating non-numeric expressions such as symbolic expressions, it is to be understood that in some implementations, the system 100 may not be capable of evaluating one or more of symbolic expressions, algebraic expressions, graphic expressions, etc.

Further, the system 100 is only one example of a system that may be utilized to implement methods and techniques described below. Other example systems include a spreadsheet application, a simulation application, a control system application, an instrument application, a game application, etc. Further, the computational software application 104 need not be an interpretive system, but may also include a system that utilizes compilation.

Data Functions

Examples of a type of object which will be referred to as a "data function" that can be used with various types of computational software applications, such as the computational software application 104 of FIG. 1, will now be described. Data functions will be described in the context of the example system 100 of FIG. 1. It is to be understood, however, that data functions may be implemented by systems other than the example system 100.

A data function generally is a function implemented by a computational software application that retrieves data from a database. Such a data function may allow a user to use the computational software application to obtain information such as the population of a country, stock prices, nutrition data, etc. In the example system 100 of FIG. 1, data functions may be implemented by the computational software application 104. The evaluator of the kernel 124 may be configured to evaluate the data functions, and the data functions may be included in the library of the kernel 124. In the example system 100 of FIG. 1, the data functions may be treated by the kernel 124 as expressions.

Data functions may include a keyword and one or more arguments. For instance, one example data function may be a function for retrieving data related to countries. A keyword for the function could be CountryData, and arguments could be used for specifying a particular country and specific data for the specified country. For instance, execution of the data function CountryData["France", "Population"] could cause the computational software application 104 to retrieve from the database system 108 a number indicating the population of France. As another example, the command CountryData ["Germany", "GDP"] could cause the computational software application 104 to retrieve from the database system 108 a number indicating the gross domestic product (GDP) of Germany.

In systems that include a local database 138, when a data function is received from the front end 128, the kernel 124 may first determine whether the requested data is stored in the local database 138. For instance, the kernel 124 could use one or more of the keyword and the arguments to determine whether the requested data is stored in the local database 138. If the requested data is not stored in the local database 138, the kernel 124 may then send a request for the data to the database interface 132. The database interface 132 could then retrieve the requested data from the database system 108 via the network 112. Then, the database interface 132 could provide the requested data to the kernel 124.

Optionally, the kernel 124 could send a request for the data to the database interface 132, and the database interface 132 could determine whether the requested data is stored in the local database 138. In this implementation, if the database interface 132 determines that the requested data is not in the local database 138, the database interface 132 could then retrieve the requested data from the database system 108 via the network 112, and provide the requested data to the kernel 124.

Data associated with the data functions may be organized as a plurality of keys, each key having associated properties. With the "CountryData" example discussed previously, the keys associated with this data function may correspond to a plurality of different countries (e.g., Canada, France, Ireland, Germany, Mexico, etc.). Further, each country may have associated therewith a plurality of properties (e.g., population, area, GDP, capital city, etc.).

Figure 3A:
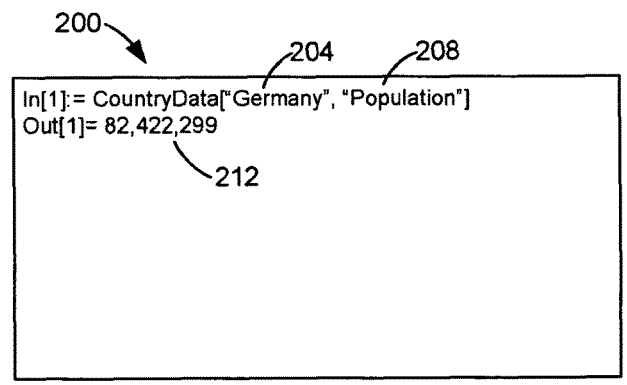
FIG. 3A is an illustration of another example notebook in which a data function CountryData has been entered.

FIG. 3A is an illustration of an example notebook 200 in which the CountryData data function has been entered by a user. In particular, a user entered the data function CountryData["Germany", "Population"] and then pressed SHIFT-ENTER, for example. In response, the computational software application 104 retrieved a number 212 indicating the population of Germany from a database and presented the number in the notebook 200.

Figures 3C, 3D:
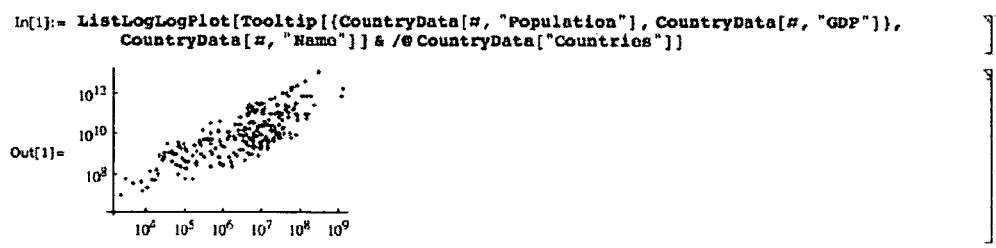
FIG. 3C is an illustration of another example notebook in which the data function ElementData is included as part of a larger expression.
FIG. 3D is an illustration of another example notebook in which the data function CountryData is included as part of a larger expression.

A data function may be included in some other function or expression. FIG. 3B is an illustration of an example notebook 230 in which the CountryData data function is included as part of a larger expression that results in the generation of a table of data values corresponding to the CountryData data function. FIG. 3C is an illustration of an example notebook 235 in which the ElementData data function is included as part of a larger expression that results in the generation of a table of data values corresponding to the ElementData data function. Data corresponding to the ElementData data function may include an indication of the country in which each element was discovered. The example notebook 235 illustrates an expression that uses the ElementData data function to generate a table indicating how many elements were discovered in each country. FIG. 3D is an illustration of an example notebook 240 in which the CountryData data function is included as part of a larger expression that results in the generation of a scatter plot of data values corresponding to the CountryData data function. Data corresponding to the CountryData data function may include population and gross domestic product (GDP) data. The example notebook 240 illustrates an expression that uses the CountryData data function to generate a log-log scatter plot relating each country's population to its GDP. In other examples, a data function may be included as part of an expression that performs numeric or symbolic processing, analysis, etc., of the data corresponding to the CountryData data function.

In implementations that include a local database 138, the computational software application 104 may update the local database 138 with data from the database system 108. For example, the local database 138 may initially include no data. But as data functions are executed, data retrieved from the database system 108 via the network 112 may be stored in the local database 138. In this way, if a user subsequently requests data that was previously requested, the computational software application 104 may obtain the data from the local database 138 instead of from the database system 108 and via the network 112. Additionally, at least some of the data may be versioned. Thus, data in the local database 138 could be updated if the database system 108 includes a more recent version of the data. The data in the local database 138 could be updated, for example, manually at the request of a user, periodically (e.g., once a day, once a week, once a month, etc.), when the data is requested (e.g., in response to execution of a data function that attempts to retrieve the data), etc. Version data could be associated with one or more of a file that includes data corresponding to a data function, data corresponding to a specific data function, a specific key, and a specific property, data corresponding to a key of a data function, data corresponding to a property for all keys of a data function, etc.

In some implementations, the database system 108 may transmit requested data along with un-requested data. For instance, the database system 108 may transmit to the computational software application 104 a file that includes the requested data along with data that was not requested. For example, if the request corresponded to CountryData ["France", "Population"], the database system 108 may transmit to the computational software system 104 a file that includes all key/property data corresponding to the data function CountryData. As another example, the file may only include all properties for the key "France." As yet another example, the file may only include the "Population" properties for all keys corresponding to the data function CountryData. As still another example, the file may only include all the properties of countries that are somehow associated with France, such as all countries in Europe. As a further example, a prediction may be made regarding what other data the user may request based on a plurality of previous data requests by the user. In this example, the file may include key/property data corresponding to the prediction. The computational software application 104 (e.g., one or more of the kernel 124, the front end 128, and the database interface 132) and/or the database system 108 may generate the prediction. The requested data and the un-requested data may be obtained in one unitary operation or obtained, for example, separately. For example, the database interface 132 may transmit a first request for the specifically requested data. Additionally, the database interface 132 may generate a second request for a broader range of data related to the requested data (e.g., a category of data, a prediction of data that may be requested in the future, etc.). In response to the first request, the database system 108 may obtain the requested data and transmit the requested data to the computational software application 104. Additionally, in response to the second request, the database system 108 may obtain the broader range of data and transmit the broader range of data to the computational software application 104. Generation of the second request and/or satisfaction of the second request could be handled as a lower priority than the first request so that, for example, handling the second request does not noticeably delay handling of the first request. In another implementation, the database interface 132 may transmit only a single request. In response to the single request, the database system 108 may obtain the requested data and transmit the requested data to the computational software application 104. Additionally, in response to the single request, the database system 108 may obtain a broader range of data related to the requested data (e.g., a category of data, a prediction of data that may be requested in the future, etc.), and transmit this data separately to the computational software application 104. Obtaining and transmitting the broader range of data could be handled as a lower priority than the specifically requested data so that, for example, obtaining and transmitting the broader range of data does not noticeably delay obtaining and transmitting the specifically requested data. In yet another implementation, the database interface 132 may transmit only a single request. In response to the single request, the database system 108 may determine a broader range of data that should be obtained and then obtain the broader range of data, where the broader range of data includes the specifically requested data. Then, the broader range of data is transmitted to the computational software application 104. One of ordinary skill in the art will recognize many other variations. The data transmitted by the database system 108 (e.g., a file such as described above) may be stored in the local database 138. Thus, if the user subsequently enters the data function CountryData["Germany", "Population"], for example, this data may have been stored in the local database 138 in response to a previous evaluation of the data function CountryData["France", "Population"]. In this way, the computational software application 104 may be able to reduce data access times in at least some cases, as compared to retrieving data from the database system 108 in response to each data function.

Figure 4:
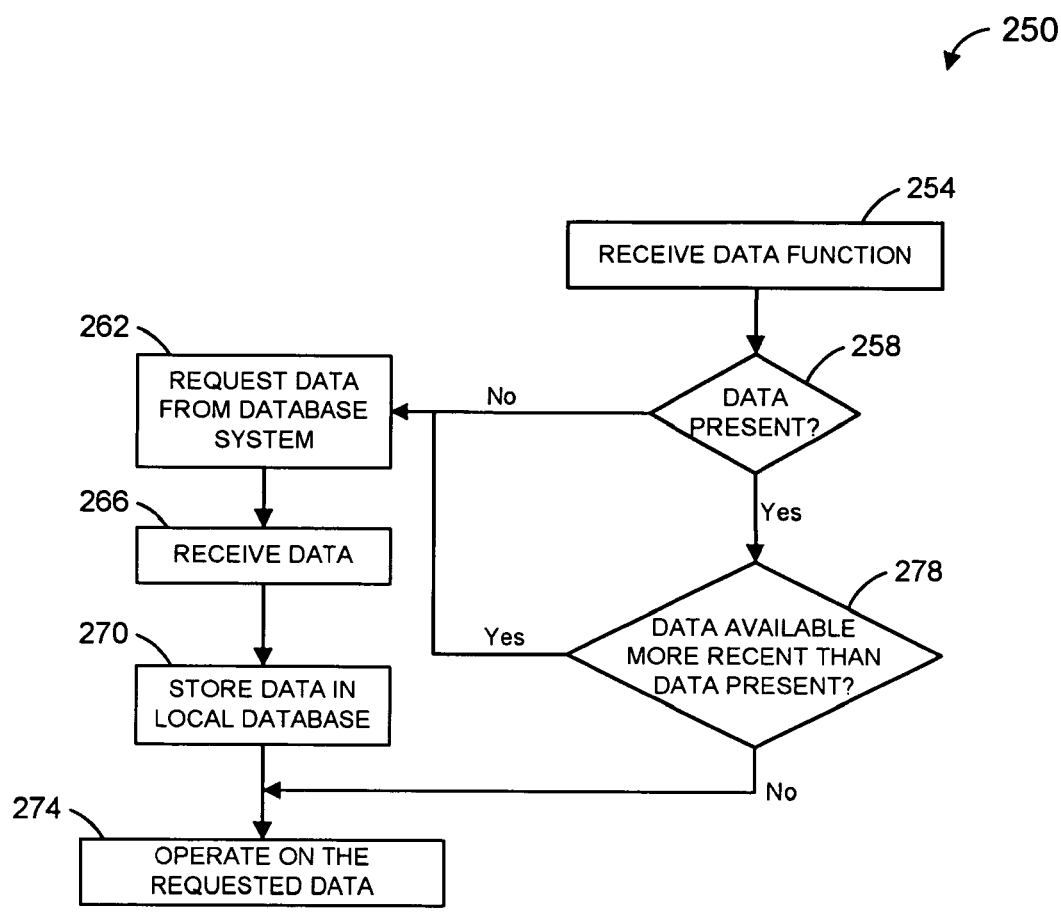
FIG. 4 is a flow diagram of an example method by which a computational software application may retrieve data from a database in response to a data function.

FIG. 4 is a flow diagram of an example method 250 by which a computational software application may retrieve data from a database. The method 250 may be utilized with a system that includes a local database such as the local database 138 of FIG. 1. The method 250 may be implemented by a system such as the system 100 of FIG. 1, and will be described with reference to FIG. 1 for ease of explanation. Of course, the method 250 can be implemented by systems other than the system 100, and the system 100 need not implement the method 250.

At a block 254, the computational software application 104 may receive a data function. For example, a user may enter a data function into a notebook and press SHIFT-ENTER. As described above, the data function may indicate particular data that is to be retrieved.

At a block 258, the computational software application 104 may determine if the requested data indicated by the data function is stored in the local database 138. If data in the local database 138 is stored in files, the computational software application 104 may include a table, a list, etc., that indicates in which file data corresponding to a particular data function is stored. For instance, data corresponding to the data function CountryData may be stored in a first file, whereas data corresponding to a data function AnimalData may be stored in a second file. In these implementations, determining if the requested data indicated by the data function is stored in the local database may include determining if the file corresponding to the data function is stored in the local database 138.

If the requested data is not stored in the local database 138, the flow may proceed to a block 262, at which the computational software application 104 may request data from the database system 108. At a block 266, the database system 108 may transmit the requested data to the computational software application 104 via the network 112 in response to the request from the computational software application 104. Then, the computational software application 104 may store the requested data in the local database 138.

In some implementations, the database system 108 may also transmit related or relevant data, i.e., data in addition to the requested data and related or relevant to the requested data. The system 100 may determine the related or relevant data from a variety of factors including, but not limited to, the requested data, past data requested by the user, the data function, past data functions invoked by the user, the proximity of the relationship between the currently-requested data and the related data, the relevancy of the currently-requested data and other data, any other indication that the user has or may subsequently request the related data, etc. For example, data corresponding to a data function CityData may be organized at least by the size of cities. So, if data is sought for a major city, such as Chicago or Hong Kong, the database system 108 may also transmit data for other cities of comparable size. Similarly, data corresponding to a data function CityData may be organized additionally or alternatively by country, geography, etc.

At a block 274, the requested data may be operated on by the computational software application 104. For example, in the system 100, the requested data may be provided to the front end 128 for display to a user. As another example, if the data function was an argument to another function, the other function could be evaluated using the requested data.

If at the block 258 it is determined that the requested data indicated by the data function is stored in the local database 138, the flow may proceed to a block 278. At the block 278, it may be determined whether there is an update associated with the requested data available from the database system 108. This may comprise comparing version data associated with the requested data stored in the local database 138 with version data associated with the requested data stored in the database system 108. The version data may include a version number and/or date information, for example. The version data may correspond to the requested data, a file in which the requested data is stored, all properties associated with a key, the same property for each of a plurality of keys, etc. Thus, for instance, if it is determined that the database system 108 has a more recent version of a file that includes the requested data, the more recent version of the file may be transmitted to the computational software system 104 via the network 112 and then stored in the local database 138. In some implementations, this may occur even though the requested data in the old version of the file is the same as the requested data in the new version of the file, whereas other data in the new version of the file may differ from that of the old version of the file.

Determining whether there is an available update associated with the requested data may comprise the computational software application 104 sending a request to the database system 108 for an indication of the most recent available version. In response, the database system 108 may send to the computational software application 104 version data associated with the most recent available version. The computational software application 104 may then compare the version data received from the database system 108 to version data associated with the requested data stored in the local database 138. For example, if data in the local database 138 is stored as files, the files may include metadata that includes version data. The computational software application 104 may compare this version data with the version data received from the database system 108.

Alternatively, determining whether there is an available update associated with the requested data may comprise the computational software application 104 sending a request to the database system 108 for a most recent available version. The request may include an indication, such as version data, of the version stored in the local database 138. In response, the database system 108 may then compare the version data received from the computational software application 104 to version data associated with the most recent available version stored at the database system 108. For example, if data in the local database 138 is stored as files, the files may include metadata that includes version data. The database system 108 may compare this version data with the version data associated with the most recent available version of the file at the database system 108. Then, the database system 108 may send to the computational software application 104 an indication of whether a more recent version associated with the requested data is available. Optionally, if the database system 108 determines that there is a more recent version available, the database system 108 may send the more recent version to the computational software application 104 without waiting for an explicit request for the data from the computational software application 104.

If at the block 278 it is determined that there is an available update associated with the requested data, the flow may proceed to the block 262. On the other hand, if at the block 278 it is determined that there is not an available update associated with the requested data, the flow may proceed to the block 274.

One of ordinary skill in the art will recognize many variations to the method 250. For instance, in some implementations, the block 278 may be omitted. For example, updates may not be sent or updates may be sent to the computational software application periodically, when updates become available, etc. Also, the flow from the block 278 to the block 262 may be modified to instead flow from the block 278 to the block 266 in certain implementations.

Different types of updates could be stored at the database system 108. For example, there could be different updates for different versions of the computational software application 104. As another example, there could be different updates for different operating systems on which the computations software application 104 runs. As yet another example, there could be different updates for different combinations of computational software application 104 versions and operating system versions. One of ordinary skill in the art will recognize many other variations, such as including different updates for different types of computing systems on which the computational software application is implemented, different updates for different types of network connections, etc. In such implementations, the version data associated with requested data may also include information such as one or more of the version of the computational application system 104, the version of the operating system, the type of computing system, the type of network connection (e.g., a data rate of the connection) etc., and this information may be used in determining whether a more recent update is available.

Figure 5:
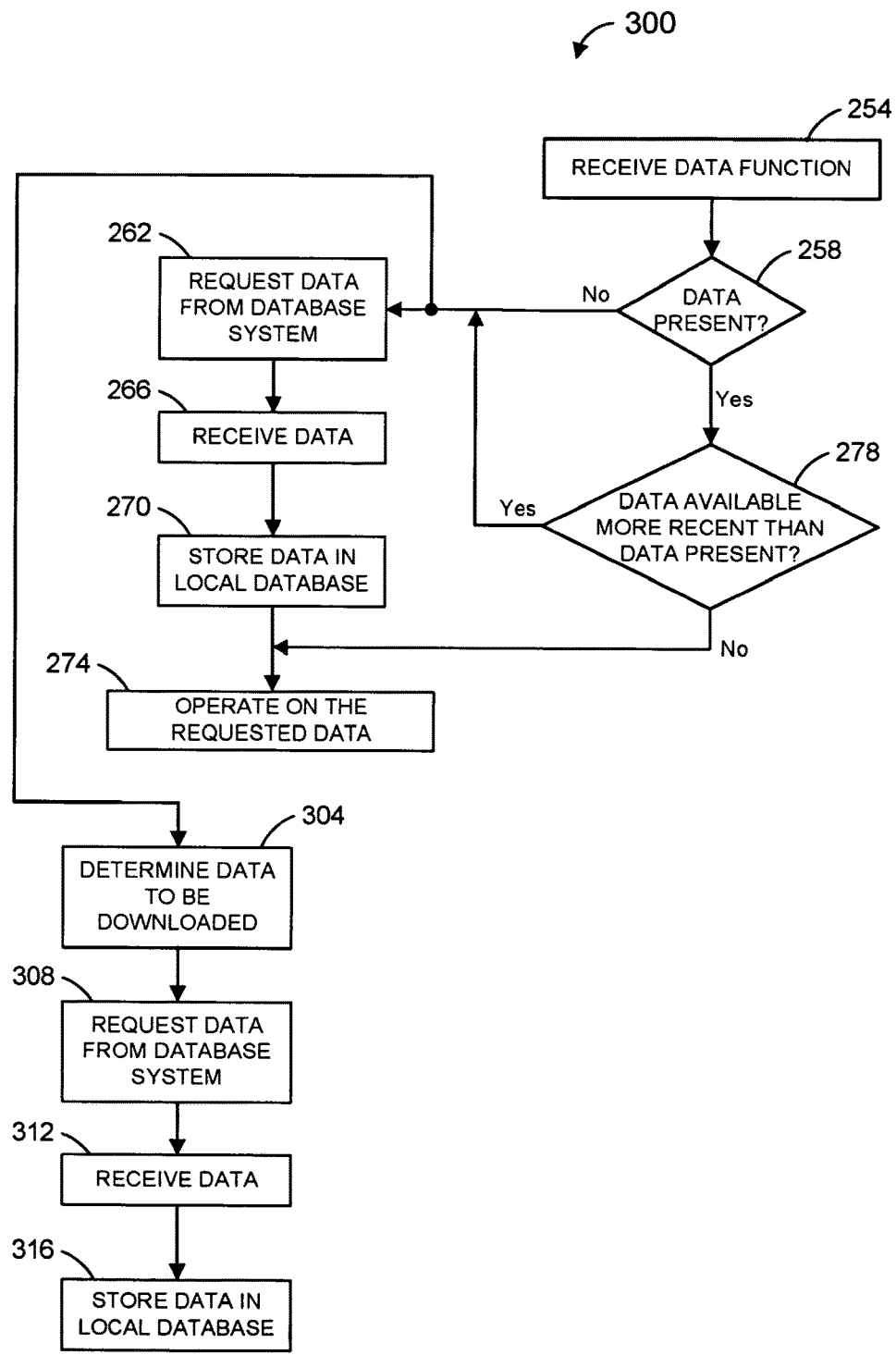
FIG. 5 is a flow diagram of another example method by which a computational software application may retrieve data from a database in response to a data function.

FIG. 5 is a flow diagram of another example method 300 by which a computational software application may retrieve data from a database. The method 300 may be utilized with a system that includes a local database such as the local database 138 of FIG. 1. The method 300 may be implemented by a system such as the system 100 of FIG. 1, and will be described with reference to FIG. 1 for ease of explanation. Of course, the method 300 can be implemented by systems other than the system 100, and the system 100 need not implement the method 300.

The method 300 is similar to the method 250 of FIG. 4, but includes additional blocks 304, 308, 312 and 316, which generally relate to obtaining, from the remote database system, data that may not have been specifically requested, and storing this data in the local database. The blocks 304, 308, 312 and 316 may be implemented in parallel with and/or at a lower priority than the blocks 262, 266, 270 and 274, which may generally relate to obtaining the specifically requested data. For instance, if at the block 258 it is determined that the requested data is not in the local database, the flow of the method 300 may proceed to both the block 262 and the block 304, and the flow may proceed from blocks 262 and 304 in parallel. Similarly, if at the block 278 it is determined that there is an update associated with requested data that is available, the flow of the method 300 may proceed to both the block 262 and the block 304.

With regard to the blocks 262 and 266, the data request sent to the database system 108 and the data received from the database system 108 may be limited to the data specifically indicated by the data function received at the block 254. Also, the block 270 optionally may be omitted.

At the block 304, related or relevant data to be obtained from the database system 108 may be determined. Determining the related or relevant data may be based on a variety of factors including, but not limited to, the requested data, past data requested by the user, the data function, past data functions invoked by the user, the proximity of the relationship between the currently-requested data and the related data, the relevancy of the currently-requested data and other data, any other indication that the user has or may subsequently request the related data, etc. For example, if the specifically requested data is related to a chemical that is used in the manufacture of silicon wafers, it may be determined that data corresponding to other chemicals used in manufacture of silicon wafers, or data corresponding to chemicals in a class of chemicals to which the specifically requested chemical should be obtained as well. For instance, if the specifically requested data is related to methane, it may be determined that data corresponding to chemicals in the class of hydrocarbons should also be obtained.

In one implementation, the database system 108 may log data requests that it receives, and this log of requests could be data-mined to create more complex strategies for determining a data set corresponding to likely future requests by a user. For instance, artificial intelligence techniques could be utilized to automatically create data set determination strategies optimized and/or customized for a particular user, class of user, etc. Data set determination strategies may be implemented as "plugins", so that they can be executed by the computational software application 104, but modified, updated, added to, etc. by the database system 108 or some other remote servers system, without having to release a new version of the computational software application 104. For example, data set determination strategy "plugins" may be made available through a load-on-demand interface.

At the block 308, a request for the data determined at the block 304 is transmitted to the database system 108, and the requested data is received from the database system 308 at the block 312. At the block 316, the data is stored in the local database.

One of ordinary skill in the art will recognize many variations to the method 300. For instance, in some implementations, the block 304 may be implemented by a database system such as the database system 108 as opposed to a local application such as the computational software application 104. In such an implementation, the data determined at the block 304 and obtained by the database system 108 could be transmitted to the computational software application 104 in response to the request corresponding to the block 262.

An example format of a file in which requested data may be stored will now be described. In this example, the file includes data associated with one data function. For example, a file may include data corresponding to a CountyData data function. All data corresponding to a data function may be included in one file, or optionally in multiple files. The example format discussed below helps to facilitate platform independence, lookup speed, and storage efficiency. This file format is for use with a system that utilizes the MATHEMATICA® software system. It is to be understood that this example file format is not necessary, and other file formats may also be used with systems and methods such as described above. For example, in systems that do not utilize the MATHEMATICA® software system, other file formats may be used.

In this example file format, each file includes a header block that provides information about the file. Information in the header block may include one or more of an identifier to indicate the file includes data for a data function, a version of the file, a version of the file format, a version of the MATHEMATICA® software system for which it can be used, an operating system for which it can be used, a hash of the data in the file, etc. Also, each file may include an index block that provides information about the contents of the file. For example, the index block may include information such as a count of keys in the file, a list of the keys, a count of properties, a list of the properties. The index block also may include a set of offsets to data in the file. The set of offsets may be stored as an array. The data in the file associated with the data function also may be stored in array.

In one particular implementation, the format of the file may be as set forth below. In the example file format, each datum or groups of data in a file includes information that describes its type (e.g., integer, character, string, floating point, array, etc.). In particular, a data value payload may be associated with a header, indicating its type and sometimes its size. The associated header and payload together may be referred to as a data chunk.

The following abbreviations are used hereinafter to indicate various native types.

TABLE 1

| Type | Bits | Description |
| --- | --- | --- |
| uchar | 8 | unsigned integer |
| byte | 8 | integer, signedness irrelevant |
| uint | 32 | unsigned integer |
| int | 32 | signed integer |
| uint64 | 64 | unsigned 64-bit long integer |
| int64 | 64 | signed 64-bit long integer |
| double | 64 | IEEE double-precision floating-point number |
| type[size] | n/a | 1-dimensional array of length size of type type |
| object | n/a | any file Object, describe in the list of types below |

All data payloads may be stored with their own header, which indicates how the payload should be interpreted. The first byte in each data chunk may identify the type of data Some data types, like a machine integer, may have a fixed size in bytes, and have a simple header structure:

TABLE 2

| Header | Payload |
| --- | --- |
| Type ID | Data |
| 1 byte | byte[??] |

In such cases, the length of the data bytes in the payload is fixed and may be defined by the particular value of the type ID for that chunk.

Some types, like strings, may have a variable length, so a size field may be included in the header:

TABLE 3

| Header | | Payload |
| --- | --- | --- |
| TypeID | Size | Data |
| 1 byte | 1 uchar or 1 uchar + 1 uint64 | byte[Size] |

In this particular implementation, the size does not include the size of the type ID or the bytes for the size value, only the size of the data itself. Of course, in other implementations, the size may also include the type ID and/or the size value.

The size field itself may be variable in size too. If the length of the data is less than 255, for example, then a one-byte unsigned-integer value may be used to give the actual size. If the size is greater than or equal to 255, for example, the first byte of the size field may hold a flag value, such as 0xFF (255 decimal) and some known number of bytes (such as eight bytes) may follow corresponding to a known type (such as an unsigned 64-bit integer). As an example Table 4 is illustrates a chunk corresponding to the 14-byte string "This is a test":

TABLE 4

| Header | | Payload |
|---|---|---|
| Type ID | Size | Data |
| 0x01 | 0x0E | 0x54 0x68 0x69 0x73 0x20 0x69 0x73 0x20 0x61 0x20 0x74 0x65 0x73 0x74 |

As another example, Table 5 illustrates a data chunk corresponding to a string with a length of 527 bytes: "This is a very, very, very, . . . ":

TABLE 5

| Header | | | Payload |
|---|---|---|---|
| Type | Size | | |
| ID | Flag | 64-bit Size | Data |
| 0x01 | 0xFF | 0x0F02000000000000 | 0x54 0x68 0x69 0x73 0x20 0x69 0x73 0x20 0x61 0x20 . . . |

The following data types are supported in this example file format. In other implementations, some of these data types need not be supported, and other data types not listed below may be supported.

String
ID: 0x01
Size: Variable
A String may be encoded using UTF-8 as the character encoding. Strings are a sized type.

TABLE 6

| 0x01 | Size | byte[Size] |
|---|---|---|

Symbol
ID: 0x02
Size: Variable
A Symbol may be serialized the same way as a string, but have a different ID to distinguish it from pure strings.

TABLE 7

| 0x02 | Size | byte[Size] |
|---|---|---|

Machine Integer
ID: 0x10
Size: 5 bytes
A Machine Integer may be a 32-bit signed integer (int).

TABLE 8

| 0x10 | int |
|---|---|

Machine Real
ID: 0x11
Size: 9 bytes
A Machine Real may be stored as a 64-bit IEEE double-precision floating-point number.

TABLE 9

| 0x11 | double |
|---|---|

Machine Complex
ID: 0x12
Size: 17 bytes
A Machine Complex is a complex number where both the real and imaginary components are Machine Real.

TABLE 10

| 0x11 | double (Real component) | double (Imaginary component) |
|---|---|---|

Big Integer
ID: 0x20
Size: Variable
For integer values that are too large to be stored as a Machine Integer, the Big Integer type can store numbers of up to 4,294,967,295 256-bit digits. Because integer values can be signed, the Size field below may be modified to support a sign bit.

TABLE 11

| 0x20 | SizeWithSign | byte[Size] |
|---|---|---|

When a sign value s is needed, the high bit of the first byte (of the size field) may be used to indicate sign.

TABLE 12

| Value | Meaning |
|---|---|
| 0 | Positive or Zero (Sign[num] is 0 or 1) |
| 1 | Negative (Sign[num] is −1) |

Similar to the normal size field, when the length is less than 127 and sign is s, a single byte may be used to store both pieces of information. The low 7 bits of the byte may be used to store the size:

TABLE 13

| Size | |
|---|---|
| s | 7-bit size |

When the length is greater than 127 and sign is s, for example, the 7-bits of the first byte take the flag value 127 (1111111 binary), and a full 64-bit size is given:

TABLE 14

| Size | | |
|---|---|---|
| Sign | Flag | 64-bit Size |
| s | 1111111 | uint64 |

Big Real
ID: 0x21
Size: Variable

A Big Real is used when a real-valued number is too large or high-precision to be stored in a standard Machine Real. Like a Big Integer, such numbers are also signed, and so the same Signed Size field may be used to represent both the length of the digit list as well as the sign of the number. In addition to a list of digits, a large real number also has an exponent that gives the position of the decimal point in the list of digits, and a precision that gives the number of significant digits. The precision may be stored as an arbitrary object, since it can be any real number or integer.

The digits and exponent for a real number can be obtained by using RealDigits[num, 256]. A number can be reconstructed from the digit list and exponent with FromDigits[{digits, exponent}, 256]. The precision can be extracted with Precision[num], and reapplied with SetPrecision[num, prec].

TABLE 15

| 0x21 | SizeWithSign | byte[Size] (digits) | int (exponent) | object (precision) |
|---|---|---|---|---|

Complex
ID: 0x22
Size: Variable

A generic Complex is used when one or both components of a complex number are not a Machine Real, and hence cannot be serialized as a Machine Complex. Each component may be stored as any valid type, and each component can be of a different type.

TABLE 16

| 0x22 | object (Real component) | object (Imaginary component) |
|---|---|---|

Rational
ID: 0x23
Size: Variable

A Rational is a rational number serialized as its numerator and denominator components. Like a Complex, each component can be any valid type and can be of different types.

TABLE 17

| 0x23 | object (Numerator) | object (Denominator) |
|---|---|---|

List
ID: 0xA0
Size: Variable

The List type is used to serialize any generic, one-dimensional or non-rectangular list of data. Each element of the list can be any valid type, including another List.

TABLE 18

| 0xA0 | Size | object[Size] |
|---|---|---|

Array
ID: 0xA1
Size: Variable

Much like a List, the Array type is used to stored rectangular arrays of data, composed of arbitrary MATHEMATICA® software system types or expressions. Each element of the array can be any valid type. In addition to the elements themselves, the dimensions of the array (the output of Dimensions[array] are stored so that the array can be reconstructed with Fold[Partition, elements, Most[Reverse[dims]]].

TABLE 19

| 0xA1 | Size | uint[Size] (Dimensions) | object[Times@@dims] |
|---|---|---|---|

PackedArray
ID: 0xB0
Size: Variable

A PackedArray corresponds with the MATHEMATICA® software system concept of the same notion, and can be used to serialize arrays that consist entirely of machine integers, reals or complexes. The function Developer'PackedArrayQ can be used to check for packed arrays.

TABLE 20

| 0xB0 | Type | uint[Size] (Dimensions) | type[Times@@dims] |
|---|---|---|---|

SparseArray
ID: 0xB1
Size: Variable

Arbitrary Expression
ID: 0xE0
Size: Variable

Arbitrary expressions are any MATHEMATICA® software system code that cannot be serialized into any of the above types. Arbitrary expressions may be serialized as follows:

1. The expression is stringified with ToString[Hold[expr], FullForm].
2. The string is compressed to byte values with Developer'RawCompress[ToCharacterCode[str]]

The string of bytes is then stored in the file with the usual variable-size field.

TABLE 21

| 0xE0 | Size | byte[Size] |
|---|---|---|

Raw Bytes (Uninterpreted)
ID: 0xFF
Size: Variable

This data type allows custom storage for a byte string representation of data that do not fall under any of the specified formats above. Interpretation may be left to the user of the file. Any necessary headers, etc. should be included in the raw byte stream to make the necessary interpretations.

TABLE 22

| 0xFF | Size | byte[Size] |
|---|---|---|

Undefined IDs
Undefined IDs may be considered reserved for future file format versions.

TABLE 23

| 0xFF | Size | Bytes |
|---|---|---|

Index Block
In this particular implementation, the index block may have the following format.

TABLE 25

| Bytes | Type | Description |
|---|---|---|
| 8 | uint64 | count of keys |
| variable | object[ ] | key objects |
| 8 | uint64 | count of properties |
| variable | object[ ] | property objects |
| variable | int64[#keys][#props] | array of offsets |

The array of offsets gives an offset to each explicit data location in the body of the data. If the data is included in multiple files, the index block may include data indicating in which file each data item is located.

Data Block

In this particular implementation, the data block may have the following format.

TABLE 26

| Bytes | Type | Description |
|---|---|---|
| variable | object[#keys][#props] | array of data values |

Any of the techniques described above, including the blocks described with reference to FIG. 4, may be implemented using software comprising computer program instructions. Such computer program instructions may control the operation of a computing device such as a desktop computer, a laptop computer, a tablet computer, a workstation, a server, a mainframe, a cellular phone, a telephone, a set top box, a PDA, a pager, a processing system of an electronic toy, a processing system of an electronic game, a processing system of a consumer electronics device, etc. The computing device may have a memory in which the computer program instructions may be stored. The computer program instructions may be written in any high level language such as the programming language used with MATHEMATICA® software systems, C, C++, C#, Java or the like or any low-level assembly or machine language. By storing computer program instructions in a memory of the computing device, the computing device is physically and/or structurally configured in accordance with the computer program instructions.

While many methods and systems have been described herein as being implementable in software, they may be implemented in hardware, firmware, etc., and may be implemented by a variety of computing systems and devices. Thus, one or more of the method blocks and system blocks described herein may be implemented in a standard multi-purpose central processing unit (CPU), a special purpose CPU, or on specifically designed hardware or firmware such as an application-specific integrated circuit (ASIC) or other hard-wired device as desired. When implemented in software, the software routine may be stored in any computer readable memory such as on a magnetic disk, a laser disk (such as a compact disk (CD), a digital versatile disk (DVD)), a flash memory, a memory card, a memory stick, etc., or other storage medium, in a RAM or ROM of a computer or processor included in a CPU or a special purpose CPU, in any database, etc. Likewise, this software may be delivered via any known or desired delivery method including, for example, on a computer readable memory or other transportable computer storage mechanism or over a communication channel such as a telephone line, the internet, etc. (which are viewed as being the same as or interchangeable with providing such software via a transportable storage medium).

The present disclosure has been described with reference to specific examples, which are intended to be illustrative only and not to be limiting. It will be apparent to those of ordinary skill in the art that changes, additions or deletions may be made to the disclosed examples without departing from the spirit and scope of the disclosure.

What is claimed is:

1. A method for accessing a database using a computational software application implemented by one or more computer processors, wherein the computational software application comprises a plurality of built-in functions for instructing the computational software application, when executed by the one or more computer processors, to perform respective computer processor-implemented tasks, and wherein the computational software application is configured to, when executed by one or more computer processors, evaluate expressions received via a user interface implemented by the one or more computer processors, the method comprising the acts of:

receiving, at the one or more computer processors that are executing machine-readable instructions corresponding to the computational software application, a user input that specifies an expression to be evaluated by the one or more computer processors that are executing the machine-readable instructions corresponding to the computational software application, the expression including i) a first function from the plurality of built-in functions, ii) a keyword that identifies a second function from the plurality of built-in functions, wherein the expression defines, according to a specified syntax recognized by the computational software application, the second function to be a first argument of the first function, wherein the first function specifies a numerical analysis task, a plotting task, or a display formatting task, to be applied to data specified by the first argument, and wherein the second function corresponds to an instruction to retrieve a specified set of data stored in a database, wherein the keyword corresponds to a superset of data stored in the database, and iii) a second argument of the second function, the second argument specifying the set of data within the superset:

generating, at the one or more computer processors that are executing the machine-readable instructions corresponding to the computational software application, a prediction of what other database data a user will request, wherein the prediction is based on the specified set of data; and evaluating, at the one or more computer processors that are executing the machine-readable instructions corresponding to the computational software application, the expression, including:

in response to the second function, the one or more computer processors transmitting a request for the specified set of data to a database system via a network, in response to the request, the one or more computer processors receiving database data from the database system via the network, the received database data including i) the set of data within the superset and ii) one or more other sets of data that are not specified by the expression, wherein the one or more other sets of data are topically related to one or both of a) the set of data within the superset or b) one or more built-in functions, previously received via the user interface, corresponding to retrieval of data stored in the database, and wherein the one or more other sets of data correspond to the prediction of the other database data the user will request, and after receiving the database data via the network, evaluating, at the one or more computer processors that are executing the machine-readable instructions corresponding to the computational software application, the first function using the specified set of data in the received database data to perform the numerical analysis task, the plotting task, or the display formatting task, specified by the first function, on the specified set of data.

2. The method of claim 1, wherein:
the plurality of built-in functions includes a plurality of second functions for retrieving respective supersets of data stored in the database; and
a plurality of keywords respectively corresponds to the plurality of second functions.

3. The method of claim 1, wherein the received database data is the set of data within the superset.

4. The method of claim 1, wherein the one or more other sets of data are within the superset.

5. The method of claim 1, wherein the prediction is further based on one or more of:
built-in functions, previously received via the user interface, corresponding to retrieval of data stored in the database, and/or
a proximity of a topical relationship of other data in the database with the specified set of data.

6. The method of claim 1, further comprising storing the received database data in a local database.

7. The method of claim 6, wherein:
the expression is a first expression;
the set of data stored in the database is a first set;
the received database data is first received database data; and
the method further comprises:
receiving, at the one or more computer processors that are executing the machine-readable instructions corresponding to the computational software application, a user input that specifies a second expression to be evaluated by the one or more computer processors that are executing the machine-readable instructions corresponding to the computational software application, the second expression including i) a third function from the plurality of built-in functions, and ii) a fourth function from the plurality of built-in functions, wherein the second expression defines, according to the specified syntax recognized by the computational software application, the fourth function to be an argument of the third function, wherein the third function specifies a numerical analysis task, a plotting task, or a display formatting task, to be applied to data specified by the argument of the third function, and wherein the fourth function corresponds to an instruction to retrieve a specified second set of data stored in the database;
evaluating, at the one or more computer processors that are executing the machine-readable instructions corresponding to the computational software application, the second expression, including:
determining, with the one or more computer processors, whether the specified second set of data is stored in the local database,
if it is determined that the specified second set of data is not stored in the local database,
the one or more computer processors transmitting a request for the specified second set of data to the database system via a network, and
in response to the request for the specified second set of data, the one or more computer processors receiving second database data from the database system via the network, and
evaluating, at the one or more computer processors that are executing the machine-readable instructions corresponding to the computational software application, the third function using the specified second set of data i) from the local database or ii) in the received second database data to perform the numerical analysis task, the plotting task, or the display formatting task, specified by the first function, on the specified second set of data.

8. The method of claim 7, further comprising, when it is determined that the specified second set of data is stored in the local database:
determining, at the one or more computer processors, whether there is a more recent version of the specified second set of data stored at the database system as compared to a version of the specified second set of data stored in the local database;
in response to determining that the more recent version of the specified second set of data is stored at the database system, the one or more computer processors transmitting a request for the more recent version of the specified second set of data to the database system via a network; and
in response to the request for the more recent version of the specified second set of data, the one or more computer processors receiving the second database data from the database system via the network.

9. A method for accessing a database using a computational software application implemented by one or more computer processors, wherein the computational software application comprises a plurality of built-in functions for instructing the computational software application, when executed by the one or more computer processors, to perform respective computer processor-implemented tasks, and wherein the computational software application is configured to, when executed by one or more computer processors, evaluate expressions received via a user interface implemented by the one or more computer processors, the method comprising the acts of:
receiving, at the one or more computer processors that are executing machine-readable instructions corresponding to the computational software application, a user input that specifies a first expression to be evaluated by the one or more computer processors that are executing the machine-readable instructions corresponding to the computational software application, the first expression including i) a first function from the plurality of built-in functions, and ii) a second function from the plurality of built-in functions, wherein the first expression defines, according to a specified syntax recognized by the computational software application, the second function to be an argument of the first function, wherein the first function specifies a numerical analysis task, a plotting task, or a display formatting task, to be applied to data specified by the argument, and wherein the second function corresponds to an instruction to retrieve a specified first set of data stored in a database;

evaluating, at the one or more computer processors that are executing the machine-readable instructions corresponding to the computational software application, the first expression, including:
  in response to the second function, the one or more computer processors transmitting a request for the specified first set of data to a database system via a network,
  in response to the request, the one or more computer processors receiving first database data from the database system via the network, the first received database data including the specified first set of data, and
  after receiving the first database data via the network, evaluating, at the one or more computer processors that are executing the machine-readable instructions corresponding to the computational software application, the first function using the specified first set of data in the received first database data to perform the numerical analysis task, the plotting task, or the display formatting task, specified by the first function, on the specified first set of data;
receiving, at the one or more computer processors that are executing the machine-readable instructions corresponding to the computational software application, a user input that specifies a second expression to be evaluated by the one or more computer processors that are executing the machine-readable instructions corresponding to the computational software application, the second expression including i) a third function from the plurality of built-in functions, and ii) a fourth function from the plurality of built-in functions, wherein the second expression defines, according to the specified syntax recognized by the computational software application, the fourth function to be an argument of the third function, wherein the third function specifies a numerical analysis task, a plotting task, or a display formatting task, to be applied to data specified by the argument of the third function, and wherein the fourth function corresponds to an instruction to retrieve a specified second set of data stored in the database;
evaluating, at the one or more computer processors that are executing the machine-readable instructions corresponding to the computational software application, the second expression, including:
  determining, with the one or more computer processors, whether the specified second set of data is stored in the local database,
  if it is determined that the specified second set of data is not stored in the local database,
    the one or more computer processors transmitting a request for the specified second set of data to the database system via a network, and
    in response to the request for the specified second set of data, the one or more computer processors receiving second database data from the database system via the network,
  if it is determined that the specified second set of data is stored in the local database,
    determining, at the one or more computer processors, whether there is a more recent version of the specified second set of data stored at the database system as compared to a version of the specified second set of data stored in the local database,
    in response to determining that the more recent version of the specified second set of data is stored at the database system, the one or more computer processors transmitting a request for the more recent version of the specified second set of data to the database system via a network, and
    in response to the request for the more recent version of the specified second set of data, the one or more computer processors receiving the second database data from the database system via the network; and
evaluating, at the one or more computer processors that are executing the machine-readable instructions corresponding to the computational software application, the third function using the specified second set of data i) from the local database or ii) in the received second database data to perform the numerical analysis task, the plotting task, or the display formatting task, specified by the first function, on the specified second set of data.

* * * * *